(No Model.)

A. CHEZEM.
WEED CUTTER AND HORSE HOE.

No. 398,376. Patented Feb. 26, 1889.

Witnesses:
M. P. Smith
O. U. Stiles

Inventor:
Andrew Chezem
By Thomas G. Orwig, Atty.

UNITED STATES PATENT OFFICE.

ANDREW CHEZEM, OF SERGEANT BLUFFS, IOWA.

WEED-CUTTER AND HORSE-HOE.

SPECIFICATION forming part of Letters Patent No. 398,376, dated February 26, 1889.

Application filed September 28, 1888. Serial No. 286,635. (No model.)

*To all whom it may concern:*

Be it known that I, ANDREW CHEZEM, a citizen of the United States of America, and a resident of Sergeant Bluffs, in the county of Woodbury and State of Iowa, have invented a new and useful Improvement in Weed-Cutters and Horse-Hoes, of which the following is a specification.

My improvement relates specially to the machine for which United States Letters Patent were issued to me October 5, 1886, No. 350,117; and my invention consists in the combination of rotary cutters with the front part of the machine, as hereinafter set forth, pointed out in my claim, and illustrated in the accompanying drawings, in which—

Figure 1:
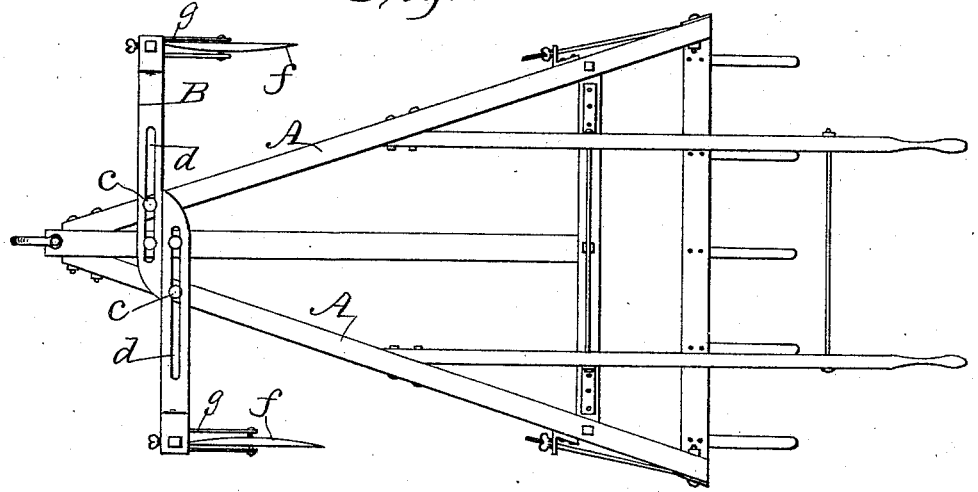
Figure 2:
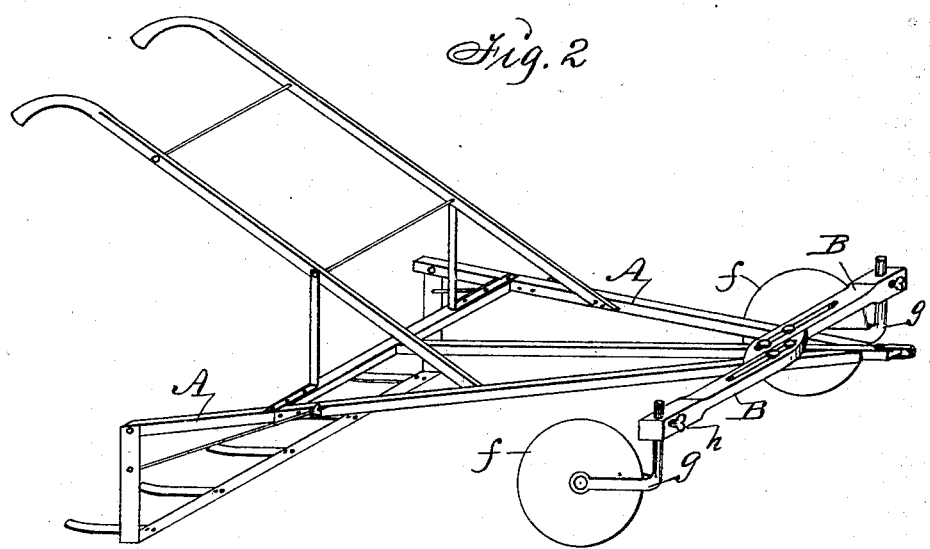

Figure 1 is a top view, and Fig. 2 a perspective view, of the machine having my rotary cutters applied as required for practical use.

A is the triangular-shaped frame.

B B are straight bars of uniform shape and size, detachably and adjustably clamped fast across the top and front portion of the frame A, by means of screw-bolts c, that are extended down through longitudinal slots d in the bars B and coinciding perforations in the frame A in such a manner that the bars will project horizontally from the opposite sides of the frame to support my rotary cutters.

f f are disks or rotary cutters, that are convex on their inside faces and journaled to bifurcated elbow-shaped bearers g in the manner caster-wheels are mounted in bearers. The bearers are adjustably connected with the ends of the bars B by extending them up through bores in the bars and then clamping them fast by means of set-screws h. By thus connecting rotary cutters with the machine they serve as weed-cutters and also as caster-wheels, and allow me to dispense with the runner and the laterally-bent cutters heretofore used.

The bars can be readily adjusted to regulate the space between the two rotary cutters, as required, to set them relative to two parallel rows of plants between which the machine is to be operated, and the bearers g can be readily raised and lowered, as required, to regulate the elevation of the front end of the machine, and the bearers can also be readily set so as to retain the rotary cutters at various angles relative to the rows of plants and line of advance, as required, to regulate the movement of loose soil relative to the plants.

I claim as my invention—

The adjustable bars B, having longitudinal slots, and the bearers g, carrying rotary cutters f, in combination with the triangular frame A, to operate in the manner set forth, for the purposes stated.

ANDREW CHEZEM.

Witnesses:
ANDREW P. HANSON,
EDWARD J. BAKER.